United States Patent
Trovato et al.

(10) Patent No.: US 6,469,742 B1
(45) Date of Patent: Oct. 22, 2002

(54) CONSUMER ELECTRONIC DEVICES WITH ADAPTABLE UPGRADE CAPABILITY

(75) Inventors: Karen I. Trovato, Putnam Valley; William P. Lord, Fishkill, both of NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/289,845

(22) Filed: Apr. 12, 1999

(51) Int. Cl.⁷ .................................. H04N 5/44
(52) U.S. Cl. .................. 348/553; 348/571; 348/725; 725/132
(58) Field of Search ................. 348/552, 553, 348/554, 555, 571, 575, 725, 460, 474; 725/131, 132, 134, 140, 141, 152, 153; H04N 5/44

(56) References Cited

U.S. PATENT DOCUMENTS

| | | | |
|---|---|---|---|
| 5,619,250 A | 4/1997 | McClellan et al. | ........... 348/10 |
| 5,809,329 A | 9/1998 | Litchman et al. | ........... 395/828 |
| 5,951,639 A | * 9/1999 | Macinnis | ........... 725/70 |
| 6,005,937 A | * 12/1999 | Lee | ........... 348/555 |

FOREIGN PATENT DOCUMENTS

| | | | |
|---|---|---|---|
| EP | A20399200 | 4/1990 | ........... H04N/7/16 |
| WO | WO9730549 | 8/1997 | ........... H04N/7/10 |

* cited by examiner

Primary Examiner—Michael H. Lee
(74) Attorney, Agent, or Firm—Gregory L. Thorne

(57) ABSTRACT

An upgradable television, in accordance with the present invention, includes a plurality of modules for providing operating functions for the upgradable television, each module capable of identifying itself to a processor. The processor is coupled to each of the modules. The processor is for recognizing changes in the modules in accordance with the identification of the modules. A receiver is operatively connected to the processor for receiving information for upgrading the upgradable television in accordance with new modules introduced into the upgradable television. A method for upgrading is also described.

18 Claims, 3 Drawing Sheets

CONSUMER ELECTRONIC DEVICES WITH ADAPTABLE UPGRADE CAPABILITY

BACKGROUND

1. Technical Field

This disclosure relates to electronic devices and more particularly, to electronic devices with the capability to be upgraded automatically by installing new hardware and/or software and remote diagnostic capability.

2. Description of the Related Art

Current computer systems use the notion of plug and play. Plug and play is the ability to plug in a device into a computer and have the computer recognize the device such that the computer can interact with the device. The user theoretically does not have to do anything other than plug in the device. While this is not a new capability, operating systems have traditionally needed to have any variable machine configuration (including the attachment of additional devices) defined to the operating systems by a user.

When a user plugs in a new device, the system detects the presence of the new device and typically asks the user to verify some configuration settings (in typical systems, if the driver is preloaded) or asks the user to feed in a floppy disk, compact disk, etc. with driver and application software.

Current television systems are self-contained electronic devices and are therefore static. While television systems have a few jacks for interconnecting video, audio, cable, etc., the television systems are not upgradable. This means that to enhance or update the properties or performance of the television system, a user must purchase a better or newer television system.

For some television systems, the television interacts with or includes other systems. For example, teletext is available in Europe. Teletext rotates through a "carousel" of text messages that are selected based on the selections made by the user on a remote control device. If the teletext device is thought of as a plurality of pages, page 1 may show a listing of local movies playing and reference a different page number for more details. For example, pages 55 through 65 may describe each movie and where and when it is playing. The pages are displayed on the television screen and in accordance with user selections. Pages are limited in number for the teletext based on available bandwidth transmitted in a Vertical Blanking Interval (VBI), and are in text and elementary graphics. Teletext is not adaptable based on the hardware of the customer and is not used to program any devices.

Therefore a need exists for an electronic consumer device, such as a television set, that is adaptable and upgradable. A further need exists for an electronic consumer device which is reconfigurable and permits hardware and software modules to be replaced to improve performance.

SUMMARY OF THE INVENTION

An upgradable television, in accordance with the present invention, includes a plurality of modules for providing operating functions for the upgradable television. Each module is capable of identifying itself to a processor. The processor is coupled to each of the modules. The processor recognizes changes in the modules in accordance with the identification of the modules. A receiver is operatively connected to the processor for receiving information for upgrading the upgradable television in accordance with changed or new modules introduced into the upgradable television.

Preferably, the processor is operatively connected to a memory for storing an operating system for controlling the upgradable television. The plurality of modules preferably include hardware modules, and at least one module is manually replaced by a new module. The processor may further include a mechanism for activating the receiver to enter a listen mode to listen for information needed to make the new module operational. The receiver preferably receives information from a remote source over a broadcast, pager, cable, satellite, or Internet network. In addition, the information may be received from other suitable communication mechanisms, as is known in the art. The modules may include at least one of replaceable software modules and electronically erasable software modules. The modules may include means for identifying individual modules within the upgradable television. A transmitter may be included for requesting upgrade data from a remote source. The upgrade data is to be delivered to the upgradable television pursuant to a request from the transmitter.

In other embodiments, a system is provided for upgrading and debugging upgradable consumer products including a plurality of upgradable devices. Each upgradable device includes a plurality of modules configured for providing operating functions for the devices. Each module is configured to identify itself to a processor, and the processor, in turn, is coupled to each of the modules. The processor recognizes changes in the modules in accordance with the identification of the modules, and a receiver is operatively connected to the processor and configured for receiving information for upgrading the upgradable devices in accordance with new modules introduced into each upgradable device. A remote station is included for providing information for upgrading the upgradable devices in accordance with the new modules introduced into each upgradable device, the remote station communicating with the upgradable devices over a network.

The remote station preferably includes a transmitter configured for transmitting upgrade information to the receivers of the plurality of upgradable devices. The upgradable devices each may include a transmitter for transmitting error messages and module failures to the remote station. The remote station is preferably responsive to the error messages and module failures such that the error messages and the module failures are managed remotely at the remote station. Each upgradable device preferably includes stored programs including an operating system for controlling the upgradable device. When at least one upgradable device module is manually replaced by a new module, the processor may further include a mechanism for activating the receiver to enter a listen mode to listen for information needed to make the new module operational. The network may include one of a broadcast network, a cable network, a satellite network and a communications network. The modules of the upgradable televisions may include at least one of replaceable software modules and electronically erasable software modules. The modules of the upgradable televisions may include means for identifying individual modules within each upgradable television. At least some of the upgradable televisions may further include a transmitter for requesting upgrade data from the remote station. The upgrade data is preferably delivered to the upgradable televisions pursuant to a request from the transmitter. The upgradable device preferably includes a television.

Also provided is a method for upgrading an upgradable device. The method including the steps of providing an upgradable device having a plurality of modules configured for providing operating functions for the upgradable device.

Each module is configured to identify itself to a processor. The processor is coupled to each of the modules, and the processor recognizes changes in the modules in accordance with the identification of the modules. A receiver is operatively connected to the processor and is configured for receiving information for upgrading the upgradable device in accordance with new modules introduced into the upgradable device. The step of replacing at least one module with a new module is included. The steps of identifying the new module and determining if resources are available for proper function of the new. module are also included. The step of automatically retrieving resources from a remote source is included for proper function of the new module such that the upgradable device is upgraded.

In other methods, the step of automatically retrieving resources may include the step of listening for resources transmitted from the remote source. The step of automatically retrieving resources may include the step of requesting resources to be transmitted from the remote source. The upgradable device preferably includes a television.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention relates to electronic devices and more particularly, to electronic devices with the capability to be upgraded automatically by installing new hardware and/or software. The present invention is described by way of example for televisions, however, the invention is broader and is applicable to all electronic consumer devices, such as radios, stereo systems, ovens, washers, car radios, cellular phones, clock radios, etc. The present invention preferably includes devices having digitally based systems and modular type hardware components which may easily be replaced manually. Further, the devices include software modules which may be physically replaced or upgraded by loading new software from an external source. In accordance with the invention, if software for a digital television is upgraded or a new or different upgraded piece of hardware is developed, a device of the present invention is capable of accepting the software and/or hardware and automatically reconfiguring the device to take advantage of the new software/hardware. Further, new programs which take advantage of the new software/hardware may be downloaded to a television automatically.

Figure 1:
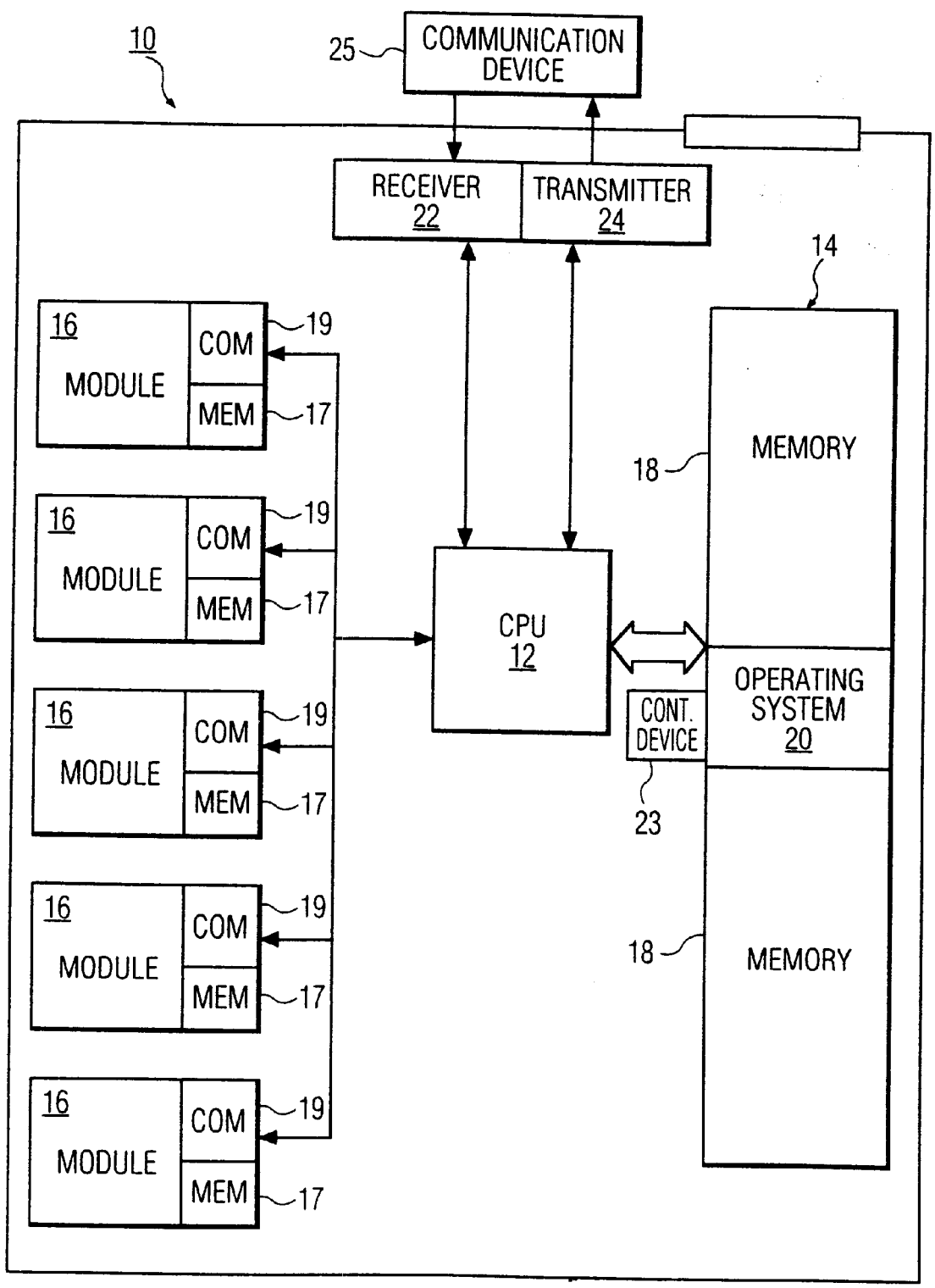
FIG. 1 is a block diagram of an upgradable device in accordance with the present invention.

Referring now in specific detail to the drawings in which like reference numerals identify similar or identical elements throughout the several views, and initially to FIG. 1, a device 10 is shown in accordance with the present invention. Device 10 includes a computer processing unit (CPU) 12 and a memory 14. Memory 14 stores software modules 18 for running, regulating and debugging hardware modules 16 of device 10. Modules 16 may include various functions in device 10.

In a preferred embodiment, device 10 is a digital television. Modules 16 may include video signal processing units, audio processing units, timer units, communication modules (radio frequency, infrared, serial/parallel ports, etc.), graphics processors, game interfaces, memory devices (random access memory or cache), secondary memory devices (tape CD, CD-ROM) , etc.

Modules 16 each include a memory 17 and a comminations port 19. In this way, modules 16 may communicate directly to other modules 16 by communication protocols that may not need to go through CPU 12. This may be implemented using a bus arbitrator. Alternately, communication between modules is through CPU 12 having an operating system 20 which is preferably stored in memory 14. Modules 16 may include device drivers and protocols for interfacing with CPU 12 stored in memory 17. Memory 14 includes software modules 18. Software modules 18 may be manually removable from memory 14 or permanently secured and electronically removable. Each module 18 may include specific information about updates and versions of the software included thereon. Memory 14 preferably includes operating system 20 which provides many functions. Operating system 20 includes a registry of hardware and software components therein. At startup or power up, each hardware component (modules 16) and software component (software modules 18) which is connected to CPU 12 identifies itself to operating system 20. Identification may include having a centralized, preassigned code for each device, or the identification may include classification by device type (e.g., memory), capabilities (e.g., 2 gigabit hard drive), ranges of possible hardware addresses, interrupts, or any other identification method. Operating system 20 may itself be an upgradable module similar to modules 16. A kernel or a boot up control device 23 may be included such that if operating system 20 is removed to be upgraded. An upgraded operating system may be loaded and started. Control device 23 may be located anywhere on device 10 as long as communications can be established with operating system 20.

By identifying the components, device 10 knows what hardware/software components are currently available through the registry on operating system 20. Operating system 20 further checks the identification information against the registry to determine if changes have been made. Once new modules are identified an automatic upgrade may be provided, if necessary, to device 10. When new modules are identified, device 10 includes a mechanism such as a control signal which enables a listening mode to "listen" for new drivers, application software or other information needed to integrate and upgrade device 10 to take advantage of the new module(s). Listening may be performed using a receiver 22. Advantageously, device 10 may already include a receiver 22 for receiving transmitted signals. In one embodiment, device 10 may further include a transmitter 24 for requesting specific drivers or other information to be retrieved to upgrade device 10.

Receiver 22 is capable of being coupled to a communication device 25. Communication device 25 is remotely located and is coupled to communicate with device 10 by or through at least one of a television or radio broadcast, satellite, cable, a local area network, a VCR, DVD player, pager, infrared transmission, Internet or other phone-line exchange or other communications device. Further, receiver 22 may include a disk drive for floppy disks, CD's or other storage media which may include the needed driver(s) or other information and can be loaded into device 10 manually. New application software is transmitted over one or more of the above mentioned media by manufacturers or vendors such that upgrading device 10 is preferably performed automatically without significant user interaction. Upon receiving the appropriate driver(s) or information, device 10 is upgraded and the registry of modules is updated in operating system 20.

One advantage of the present invention is that manual interaction in the upgrade is minimal. User error and online help lines needed to provide assistance to users who desire to upgrade their system are virtually eliminated. Device 10 preferably identifies its own hardware and software and may upgrade its software from a remote source. Device 10 provides an adaptable system which includes the capability for upgrading hardware and software components. Device 10 is also expandable, i.e., additional modules both hardware and software may be added. For example, memory 14 may include a removable hard disk which may be replaced with a larger hard disk or an additional hard disk may be added if appropriate steps are taken to provide the correct hardware, i.e. interfaces. Further, modules 16 may include additional memory storage.

Advantageously, the present invention reduces the need to store all software information and drivers for each device which may be potentially connected in device 10. By looking to an external source, the software/driver needs are provided without user interaction and without unnecessarily storing a plurality of different device drivers as is necessary in conventional computer systems. Device 10 configures itself.

Figure 2:
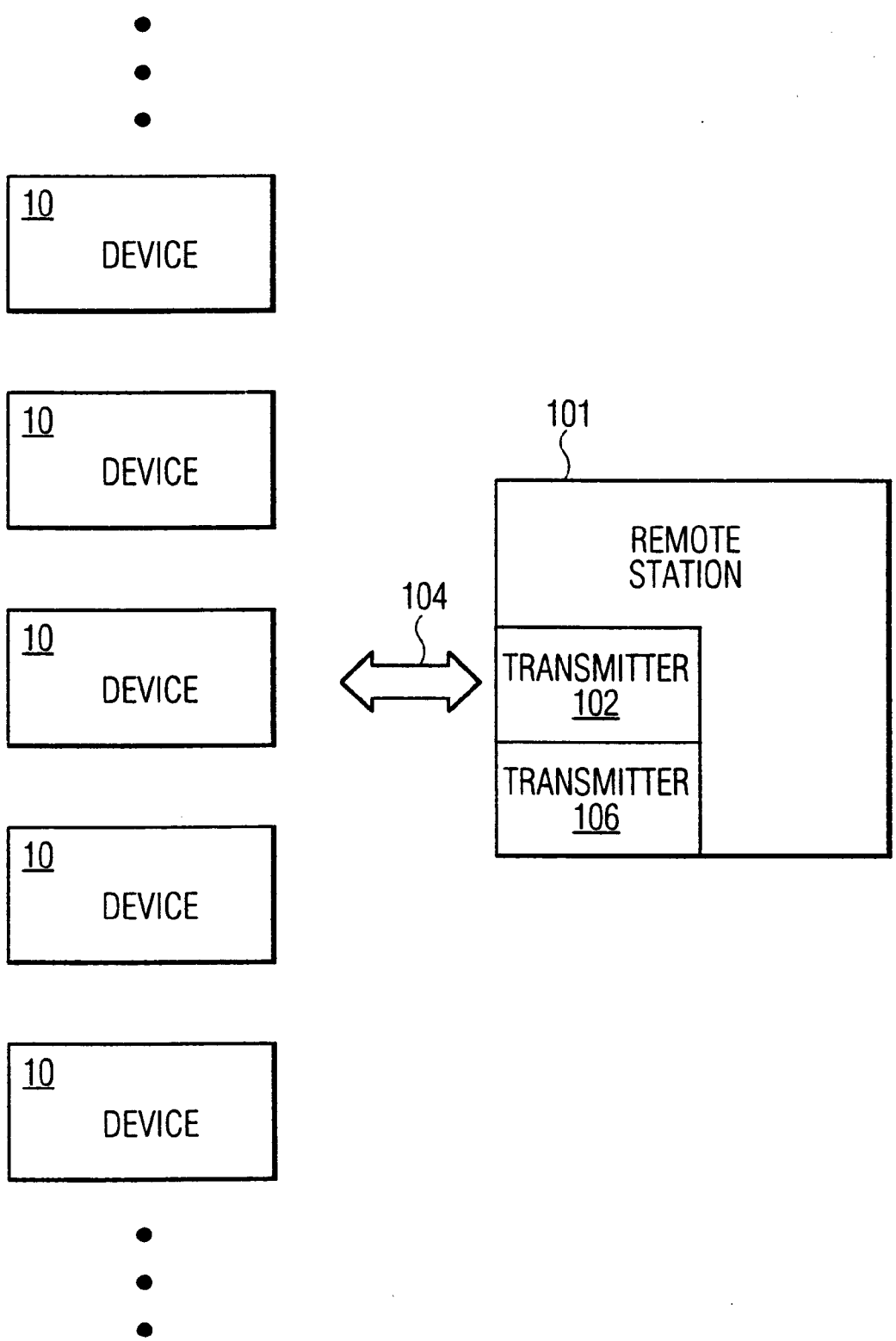
FIG. 2 is a block diagram of a system for upgrading and debugging upgradable devices remotely in accordance with the present invention.

Referring now to FIG. 2, a block/flow diagram of a debugging and upgrading system is shown in accordance with the present invention. A system 100 includes a remote station 101. Remote station 101 includes a transmitter 102 for transmitting upgrade information to a plurality of devices 10. Transmission of upgrade information may be delivered by a network 104, preferably a cable network, a television network, a radio. or telephone network, or other broadcast network or a combination thereof to devices 10. System 100 makes upgrade information available to all "listening" devices. Remote station 101 may further include a receiver 106 for receiving and handling transmission requests from devices 10 which need upgrade or new software pursuant to hardware changes as described above.

In one embodiment of system 100, devices 10 perform tests for debugging and checking device 10 components. This feature permits error information or hardware/software difficulties to be transmitted from device 10 to receiver 106. Device 10 may include a product code and user information for identifying a specific device and its location. In this way, debugging or error correction, conflicts etc. may be resolved remotely and transmitted to devices 10 directly. This advantageously excludes users from debugging devices 10.

Figure 3:
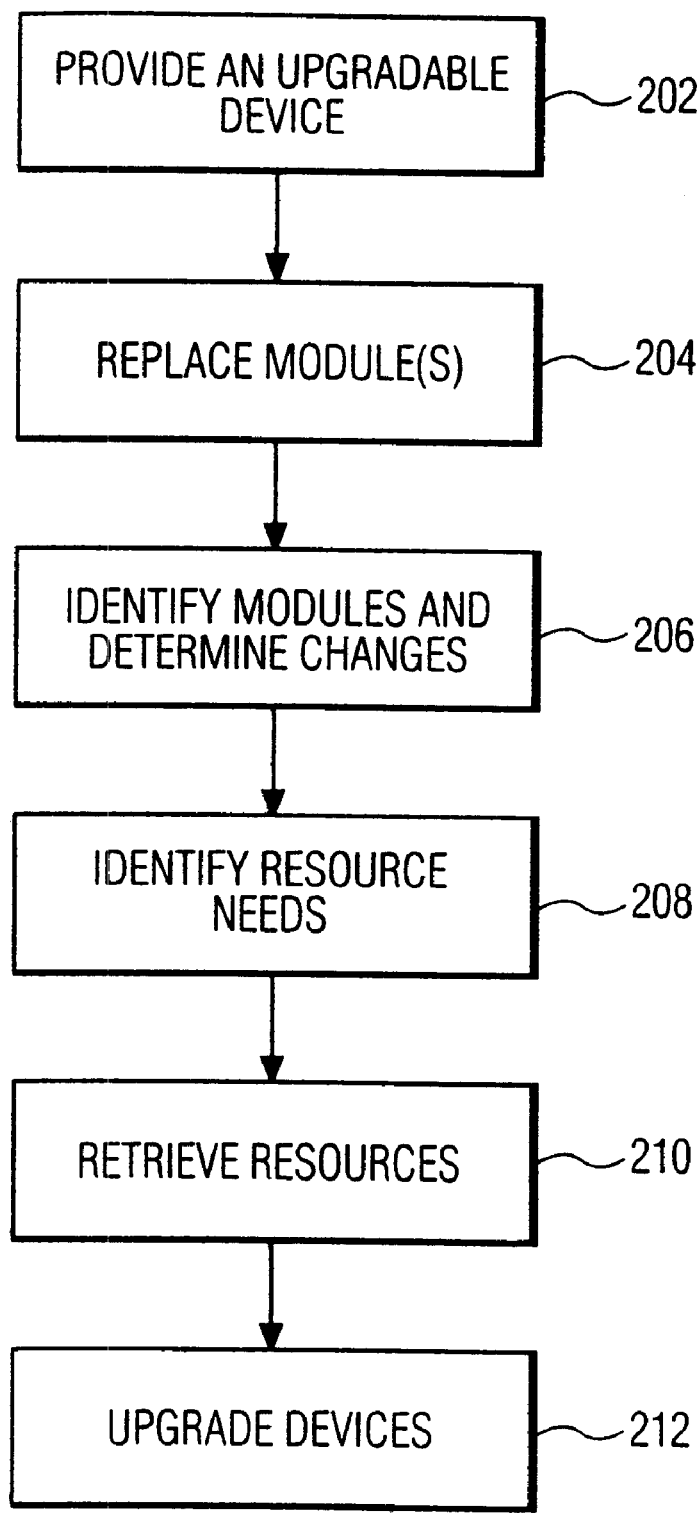
FIG. 3 is a flow diagram showing a method for upgrading an upgradable in accordance with the present invention.

Referring to FIG. 3, a method for upgrading a modular device in accordance with the present invention is shown. In block 202, an upgradable device is provided having replaceable modules for performing operating functions of the device. In a preferred embodiment, the upgradable device is a television and more preferably a digital television. As described above, the modules are capable of identifying themselves to a CPU or each other and an operating system stored in a memory. The memory further includes a registry of module identification information as well. In block 204, a module or modules are replaced manually in the upgradable device. This is performed generally by opening up the device a removing a module(s) and installing a new module. In block 206, the device is initialized or otherwise initiates an identification sequence. The modules identify themselves to the operating system which checks for changes in the modules. In block 208, if there is a change in the modules, the operating system determines if any software is missing, if errors or bugs exists or if other problems are present. In block 210, if software is needed or problems exist, the operating system signals a receiver to go into listen mode to retrieve the needed software or resources. In one embodiment, the device may include a transmitter which signals a remote station with a request for software or resources or identifies problems the upgradable device is experiencing with the new module(s). In block 212, software is delivered to the upgradable device according to the needs of the device. In this way, an upgrade and debugging of the device is achieved which is virtually transparent to the user.

Having described preferred embodiments for a novel consumer electronic devices with adaptable upgrade capability (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An upgradable television comprising:
a plurality of modules configured for providing operating functions for the upgradable television, each module configured for identifying itself to a processor;
the processor being coupled to each of the modules, the processor configured for recognizing a changed module in accordance with the identification of the modules and configured to generate a listen signal in response to a recognized change; and
a receiver operatively connected to the processor and configured to receive the listen signal and in response to the listen signal enter a listen mode to listen for information for upgrading the upgradable television in accordance with the changed module introduced into the upgradable television.

2. The television as recited in claim 1, wherein the processor includes a memory for storing programs including an operating system for controlling the upgradable television.

3. The television as recited in claim 1, wherein the receiver receives information from a remote source over at least one of a broadcast, a cable, a satellite, Internet and a communications network.

4. The television as recited in claim 1, wherein the modules include at least one of replaceable software modules and electronically erasable software modules.

5. The television as recited in claim 1, wherein the modules include means for identification for identifying individual modules within the upgradable television.

6. The television as recited in claim 1, further comprises a transmitter for requesting upgrade data from a remote source, the upgrade data to be delivered to the upgradable television pursuant to a request from the transmitter.

7. A system for upgrading and debugging upgradable televisions comprising:

a plurality of upgradable televisions, each upgradable television including;
  a plurality of modules configured for providing operating functions for the upgradable television, each module configured to identify itself to a processor;
  the processor coupled to each of the modules, the processor configured for recognizing a changed module based on the identification of the modules and configured to generate a listen signal in response to a recognized change; and
  a receiver operatively connected to the processor and configured for receiving the listen signal and in response to the listen signal enter a listen mode to listen for information for upgrading the upgradable television in accordance with changed module introduced into each upgradable television; and
  a remote station configured for providing information for upgrading the upgradable:televisions in accordance with the changed module introduced into each upgradable television, the remote station configured to communicate with the upgradable televisions over a network.

8. The system as recited in claim 7, wherein the remote station includes a transmitter configured for transmitting upgrade information to the receivers of the plurality of upgradable televisions.

9. The system as recited in claim 7, wherein the upgradable televisions each include a transmitter configured for transmitting error messages and module failures to the remote station.

10. The system as recited in claim 9, wherein the remote station is responsive to the error messages and module failures such that the error messages and the module failures are addressed remotely at the remote station and fixed at the upgradable televisions.

11. The system as recited in claim 7, wherein the processors of each television are operatively connected to a memory, said memory having a stored operating system for controlling the upgradable television.

12. The system as recited in claim 7, wherein the plurality of modules of each upgradeable television includes at least one hardware module.

13. The system as recited in claim 8, wherein the plurality of modules of each upgradable television includes hardware modules, the processor further comprises a mechanism configured to activate the receiver to enter a listen mode to listen for information needed to make a new module operational, when at least one upgradable television module is manually replaced by the new module.

14. The system as recited in claim 7, wherein the network includes one of a broadcast network, a cable network, a satellite network and a communications network.

15. The system as recited in claim 7, wherein the modules of the upgradable televisions include at least one of replaceable software modules and electronically erasable software modules.

16. The system as recited in claim 7, wherein the modules of the upgradable televisions include means for identification for identifying individual modules within each upgradable television.

17. A method for upgrading an upgradable television comprising the steps of:
  for providing operating functions by a plurality of modules for the upgradable television;
  identifying each module to a processor;
  recognizing a changed module based on the identification of the modules at the processor; entering a listen mode in response to the changed module to listen or information at a receiver for upgrading the upgradable television in accordance with new modules introduced into the upgradable television; and
  automatically retrieving resources from a remote source for proper function of the change module such that the upgradable television is upgraded.

18. The method as recited in claim 17, wherein the step of automatically retrieving resources further includes the step of requesting resources to be transmitted from the remote source.

* * * * *